US012672725B2

(12) United States Patent
Hirukawa et al.

(10) Patent No.: US 12,672,725 B2
(45) Date of Patent: Jul. 7, 2026

(54) SEAT BACK

(71) Applicant: TOYOTA BOSHOKU KABUSHIKI KAISHA, Aichi-ken (JP)

(72) Inventors: Naoya Hirukawa, Aichi-ken (JP); Kosuke Kito, Aichi-ken (JP); Eito Yoshikawa, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 105 days.

(21) Appl. No.: 18/937,687

(22) Filed: Nov. 5, 2024

(65) Prior Publication Data

US 2025/0160535 A1 May 22, 2025

(30) Foreign Application Priority Data

Nov. 17, 2023 (JP) ................................ 2023-195741

(51) Int. Cl.
| | |
|---|---|
| *B60N 2/64* | (2006.01) |
| *A47C 31/02* | (2006.01) |
| *B60N 2/58* | (2006.01) |
| *B60N 2/68* | (2006.01) |

(52) U.S. Cl.
CPC .......... *A47C 31/023* (2013.01); *B60N 2/5825* (2013.01)

(58) Field of Classification Search
CPC ...... B60N 2/5825; B60N 2/7094; B60N 2/68; B60N 2/72; B60N 2/64; B60N 2/58; A47C 31/023; A47C 31/02
USPC .......................................... 297/218.1, 284.11
See application file for complete search history.

(56) References Cited

U.S. PATENT DOCUMENTS

| | | | | | |
|---|---|---|---|---|---|
| 7,871,126 | B2 * | 1/2011 | Becker | ................. | B60N 2/0284 |
| | | | | | 297/284.11 |
| 8,240,759 | B2 * | 8/2012 | Hobl | .................... | B60N 2/5825 |
| | | | | | 297/452.59 |
| 9,409,506 | B2 * | 8/2016 | Sahashi | ................ | B60N 2/5816 |
| 9,428,087 | B2 * | 8/2016 | Adachi | ..................... | B60N 2/64 |
| 9,598,040 | B2 * | 3/2017 | Tanabe | ..................... | B60N 2/68 |
| 10,399,471 | B2 * | 9/2019 | Ito | ......................... | B60N 2/6009 |
| 10,543,764 | B2 * | 1/2020 | Oshima | .................... | B60N 2/64 |
| 12,083,939 | B2 * | 9/2024 | Miyawaki | ........... | B60N 2/42709 |
| 2013/0175838 | A1 * | 7/2013 | Oshima | ................ | B60N 2/7094 |
| | | | | | 297/284.3 |
| 2013/0264849 | A1 * | 10/2013 | Adachi | .................... | B60N 2/64 |
| | | | | | 297/216.1 |

(Continued)

FOREIGN PATENT DOCUMENTS

JP          2013-107410          6/2013

*Primary Examiner* — Shin H Kim
(74) *Attorney, Agent, or Firm* — Greenblum & Bernstein, P.L.C.

(57) ABSTRACT

A seat back includes a seat pad, and a seat frame supporting the seat pad from a pad back side. The seat frame includes a wire frame supporting a pad lower portion of the seat pad from the pad back side. The seat pad includes a pad bending back portion that extends from the pad lower portion toward a seat rear upper while covering the wire frame from a seat lower side. The wire frame includes a first wire that extends in a seat width direction while supporting the pad lower portion from a seat rear side, and a second wire that extends in the seat width direction while supporting the pad bending back portion from a seat front side that is the pad back side at a position separated from the first wire to the seat rear side.

6 Claims, 5 Drawing Sheets

(56) References Cited

U.S. PATENT DOCUMENTS

| | | | | |
|---|---|---|---|---|
| 2013/0270878 A1* | 10/2013 | Adachi | .................... | B60N 2/70 |
| | | | | 297/216.14 |
| 2015/0091361 A1* | 4/2015 | Sahashi | .................... | B60N 2/68 |
| | | | | 297/452.18 |
| 2017/0028894 A1* | 2/2017 | Niwa | ................... | B60N 2/7094 |
| 2017/0066356 A1* | 3/2017 | Niwa | ................... | B60N 2/7094 |
| 2019/0143859 A1* | 5/2019 | Sakoda | ................. | A47C 31/02 |
| | | | | 297/218.1 |
| 2025/0001907 A1* | 1/2025 | Seibold | .................... | B60N 2/02 |
| 2025/0160535 A1* | 5/2025 | Hirukawa | ............ | B60N 2/7094 |

* cited by examiner

UP

FRONT ◄——►► REAR

DOWN

SEAT BACK

CROSS REFERENCE TO RELATED APPLICATIONS

This application is based on Japanese Patent Applications No. 2023-195741 filed on Nov. 17, 2023, the entire contents of which are incorporated herein by reference.

TECHNICAL FIELD

The present invention relates to a seat back. Specifically, the present invention relates to a seat back including a seat pad and a seat frame that supports the seat pad from a pad back side.

BACKGROUND ART

JP2013-107410A discloses a seat back in which a seat pad includes a pad bending back portion that is bent back rearward from a pad lower portion in a manner of winding a lower frame of a seat frame from a seat lower side. Accordingly, the pad lower portion and the pad bending back portion are supported from a pad back side by the lower frame.

In the configuration described in JP2013-107410A, the lower frame needs to be disposed in a manner of being capable of appropriately supporting the pad lower portion and the pad bending back portion, which tends to impair a degree of freedom in a frame shape. Therefore, the present invention provides a seat back capable of appropriately supporting a seat pad while securing a degree of freedom in a frame shape of a seat frame.

SUMMARY OF INVENTION

To solve the above matters, a seat back according to the present invention is configured as follows.

According to an aspect of the disclosure, a seat back includes a seat pad, and a seat frame configured to support the seat pad from a pad back side. The seat frame includes a wire frame configured to support a pad lower portion of the seat pad from the pad back side. The seat pad includes a pad bending back portion that extends from the pad lower portion toward a seat rear upper side in a manner of covering the wire frame from a seat lower side. The wire frame includes a first wire that extends in a seat width direction in a manner of supporting the pad lower portion from a seat rear side, and a second wire that extends in the seat width direction in a manner of supporting the pad bending back portion from a seat front side that is the pad back side at a position separated from the first wire to the seat rear side. The seat pad further includes, on a pad back surface of the pad bending back portion, a first contact portion configured to come into contact with the first wire from the seat rear side.

According to this first aspect of the present disclosure, the seat pad can be assembled to the wire frame in a manner that the pad lower portion and the pad bending back portion are supported from the pad back side by the first wire and the second wire. In addition, the seat pad can be assembled to the wire frame in a manner that the first wire is sandwiched in a seat front-rear direction between the pad lower portion and the first contact portion. Therefore, the pad lower portion and the pad bending back portion can be appropriately supported even if a frame structure for supporting the pad lower portion and the pad bending back portion is implemented by a simple wire structure including the first wire and the second wire.

In the seat back of the first aspect, the pad bending back portion is configured to be wound in a manner of coming into contact with the first wire from the seat lower side, and further includes a second contact portion configured to come into contact with the second wire from the seat lower side.

According to this second aspect of the present disclosure, the pad bending back portion can be made less likely to be recessed by a pressing force from below the seat.

In the seat back according to the second aspect, the pad bending back portion includes a streak-like pad groove portion that is recessed from the pad back side between the first contact portion and the second contact portion in a manner of extending in the seat width direction.

According to this third aspect of the present disclosure, when the seat pad is assembled to the seat frame, a portion where a pad thickness is reduced due to the pad groove portion can be used as the hinge, and the pad bending back portion can be moved to be opened or closed from the pad lower portion. Accordingly, even if the pad bending back portion is provided, the seat pad can be easily assembled to the seat frame.

In the seat back according to any one of the first to third aspects, the first contact portion is a protruding portion that protrudes to a seat upper side beyond an external common tangent of the first wire and the second wire at the seat lower side.

According to the fourth aspect of the present disclosure, the first contact portion can be more appropriately brought into contact with the first wire from the seat rear side.

DESCRIPTION OF EMBODIMENTS

Figure 1:
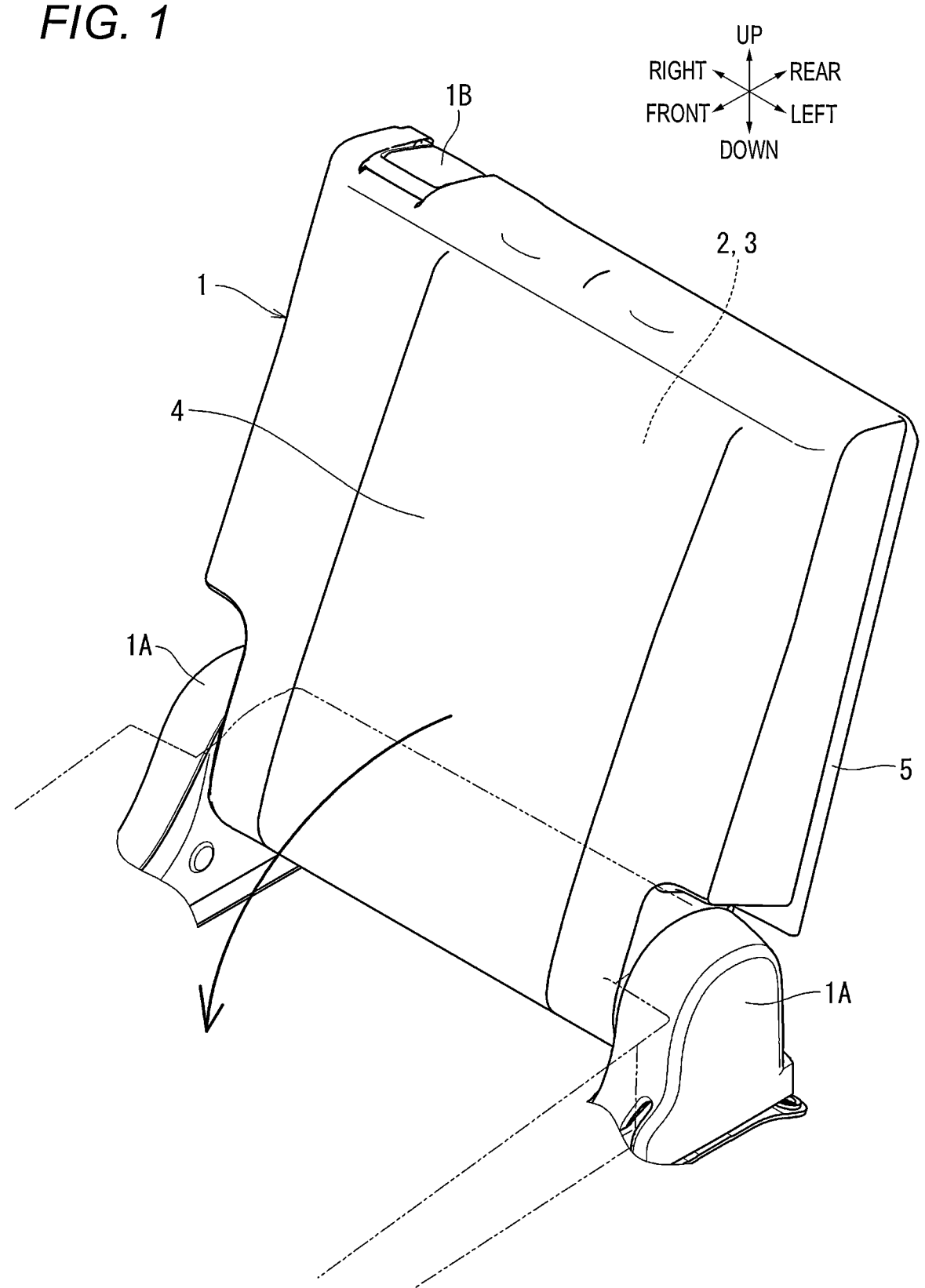
FIG. 1 is a perspective view illustrating a schematic configuration of a seat back according to a first embodiment.

Hereinafter, an embodiment of the present invention will be described with reference to the drawings.

First Embodiment

Schematic Configuration of Seat Back 1

First, a configuration of a seat back 1 according to a first embodiment of the present invention will be described with reference to FIGS. 1 to 5. In the following description, when a direction such as front, rear, up, down, left, or right is described, it is assumed that the direction indicates a corresponding direction illustrated in the drawings.

When combinations of the directions with a word "seat" are described such as a "seat width direction", the combinations indicate directions based on the seat back 1. In addition, in the following description, when a specific reference diagram is not described or when there is no corresponding reference numeral in the reference diagram, any one of FIGS. 1 to 5 is referred to as appropriate.

As illustrated in FIG. 1, the seat back 1 according to the present embodiment is implemented as a backrest of a seat in a last low of an automobile. Lower end portions on both left and right sides of the seat back 1 are connected to a pair of left and right bases 1A installed on a floor of the vehicle in a manner that a backrest angle can be adjusted around the same axis extending in the seat width direction.

Specifically, the lower end portion on one side of the seat back 1 is connected to the base 1A on the same side via a recliner (not illustrated) in a manner of being rotatable and lockable. The lower end portion on the other side of the seat back 1 is rotatably connected to the base 1A on the same side via a support shaft (not illustrated).

The recliner (not illustrated) that connects the one side of the seat back 1 to the base 1A is normally held in a state in which the backrest angle of the seat back 1 is fixed. The state in which the backrest angle is fixed by the recliner can be released by an operation in which a lever 1B provided at a shoulder of the seat back 1 is pulled up by a user.

This release makes it possible to adjust the backrest angle of the seat back 1. With the release, the seat back 1 can be rotated to a position at which the seat back 1 is tilted toward front of the seat. With this forward tilting, a luggage space (not illustrated) behind the seat back 1 can be enlarged.

When the seat back 1 is tilted forward as described above, luggage placed in the luggage space (not illustrated) may be brought into contact with, from rear of the seat, a lower portion that faces rear of the seat due to the forward tilting. However, even if the luggage is brought into contact with the seat back 1 as described above, a pad structure of the lower portion is less likely to sink inward.

Figure 2:
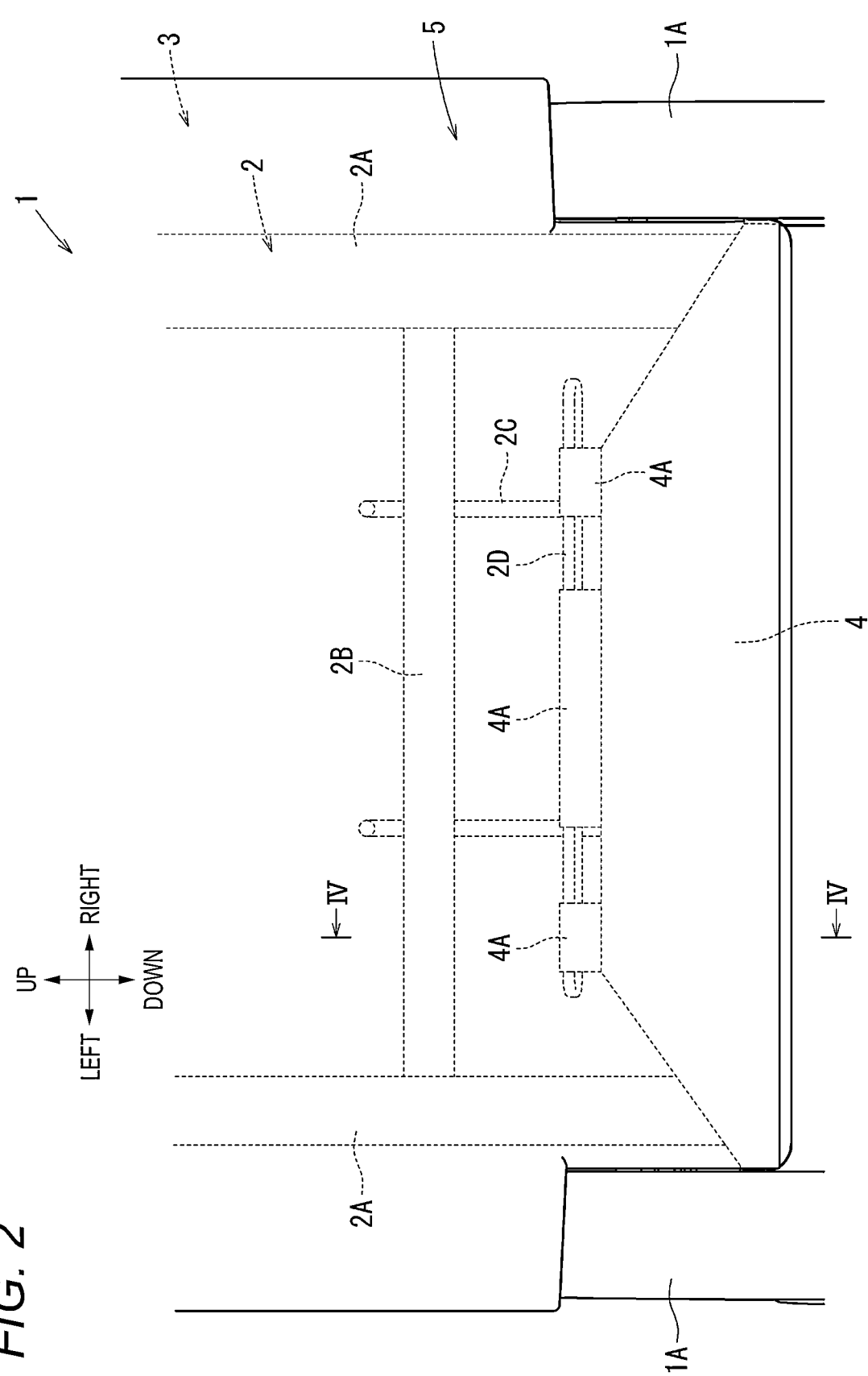
FIG. 2 is a rear view of the seat back.
Figure 3:
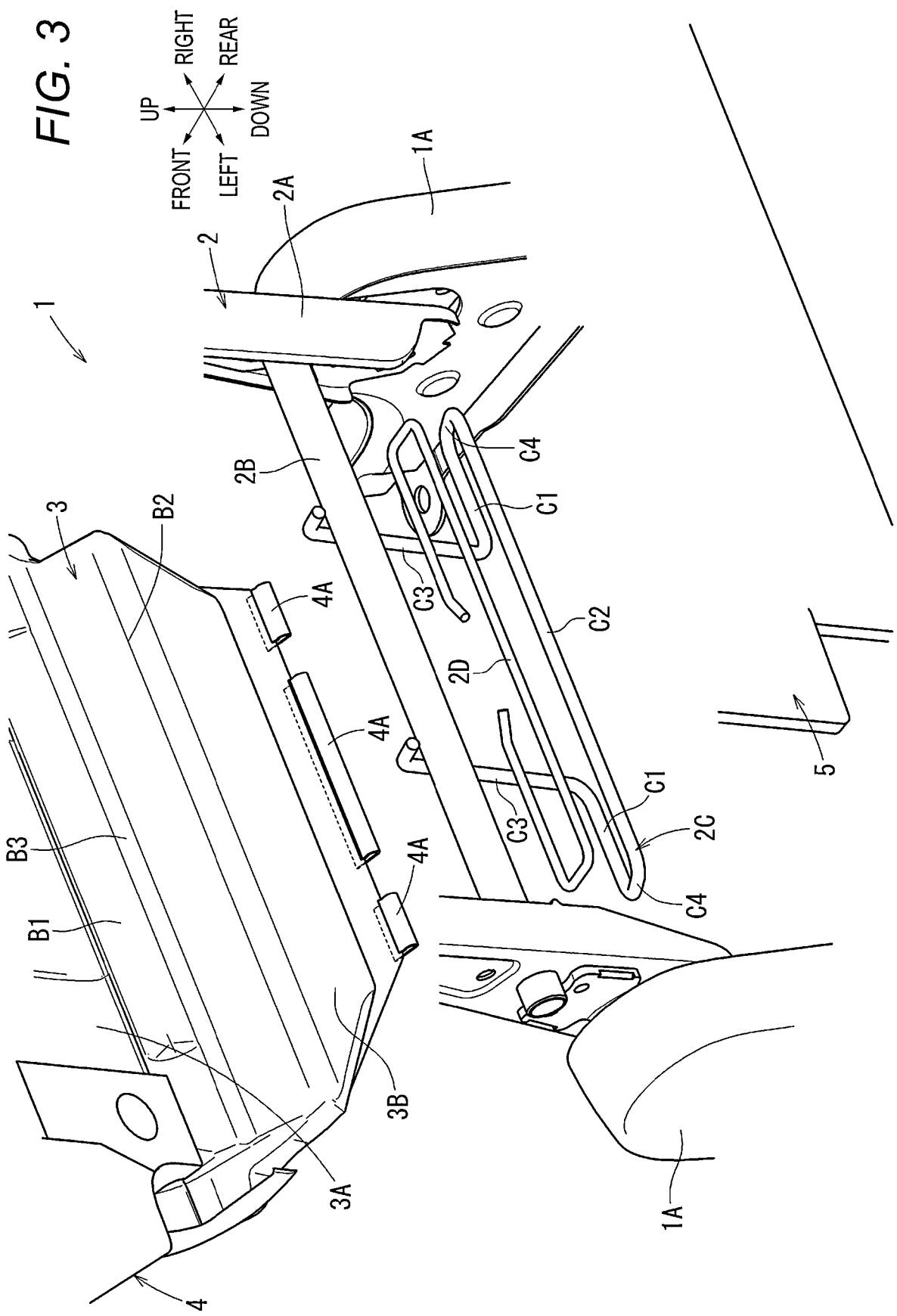
FIG. 3 is an exploded perspective view of the seat back.

Hereinafter, a specific configuration of each member of the seat back 1 will be described in detail. As illustrated in FIGS. 2 and 3, the seat back 1 includes a metal seat frame 2 that forms a framework of the seat back 1, a seat pad 3 made of foamed urethane that is placed over a front portion of the seat frame 2, and a seat cover 4 that covers the seat pad 3 from a pad front surface side. The seat back 1 includes a back board 5 that is made of resin and covers a back surface of the seat back 1.

As illustrated in FIG. 3, the seat frame 2 includes a pair of left and right long plate-shaped side frames 2A extending in a seat height direction along both left and right side portions of the seat back 1. The seat frame 2 includes an upper frame (not illustrated) extending in the seat width direction along an upper side portion of the seat back 1.

The seat frame 2 includes a reinforcing pipe 2B having a round pipe shape and connected in a manner of being bridged in the seat width direction between intermediate portions of the pair of left and right side frames 2A in the seat height direction. The seat frame 2 includes a wire frame 2C that is bent into a U-shape in a rear view and is connected to the reinforcing pipe 2B in a manner of being suspended from a front side surface. The seat frame 2 includes a hanging wire 2D that is connected in a manner of being bridged in the seat width direction between both leg portions (vertical wires C3) of the U-shape of the wire frame 2C.

The wire frame 2C is formed by bending a single wire member having a circular cross section. Specifically, the wire frame 2C includes the pair of left and right vertical wires C3 extending in the seat height direction, and a pair of left and right first wires C1 extending in a bent manner outward in the seat width direction from lower ends of the vertical wires C3.

The wire frame 2C includes a pair of left and right rearward bent wires C4 extending in a bent manner toward a seat rear upper side from the extending ends of the first wires C1. The wire frame 2C includes a second wire C2 extending in a bent manner inward in the seat width direction from rear ends of the rearward bent wires C4 so as to connect the rear ends.

Figure 4:
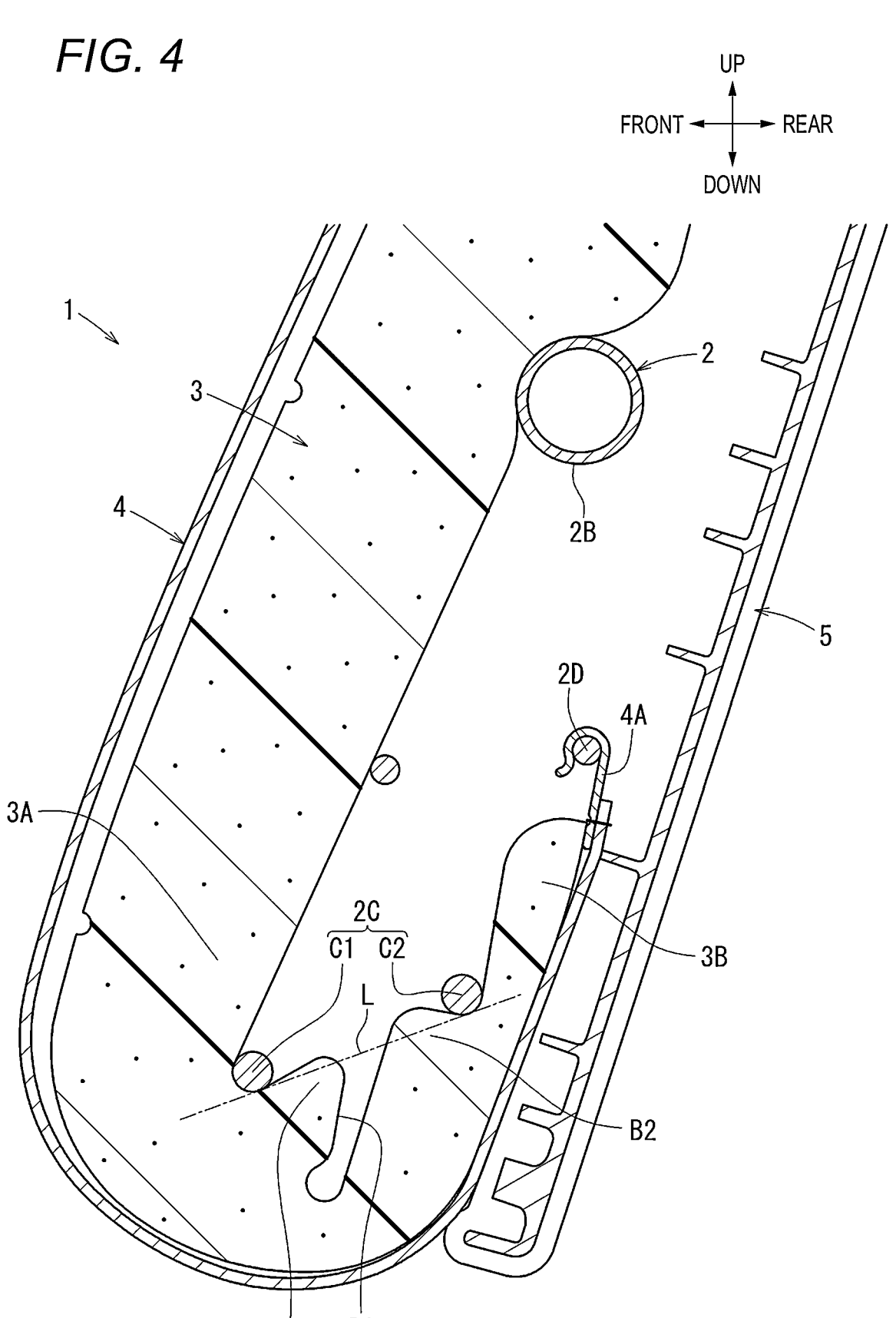
FIG. 4 is a cross-sectional view taken along a line IV-IV in FIG. 2.

As illustrated in FIG. 4, the second wire C2 is disposed at a position separated from each of the first wires C1 toward the seat rear upper side in an upright state in which the seat back 1 is at a reference angle. Each of the first wires C1 and the second wire C2 extend parallel to each other in the seat width direction. Accordingly, each of the first wires C1 and the second wire C2 are arranged in a manner that an external common tangent L on a seat lower side, which is in contact with each of the first wires C1 and the second wire C2, extends rearward and upward.

As illustrated in FIG. 3, the seat pad 3 is placed over the seat frame 2 in a manner of covering an entire front region. The seat pad 3 is pulled toward rear of the seat in a manner that upper, lower, left and right peripheral edge portions of the seat pad 3 wind frame sides of the seat frame 2 which is assembled into a frame shape in a rear view from an outer peripheral side.

As illustrated in FIG. 4, a pad lower portion 3A of the seat pad 3 is set in a manner of being brought into contact with the vertical wires C3 (see FIG. 3) and the first wires C1 of the wire frame 2C from a seat front side. In the seat pad 3, a pad bending back portion 3B extending from a lower edge of the pad lower portion 3A toward rear of the seat is pulled toward the seat rear upper side in a manner of winding the first wires C1 and the second wire C2 of the wire frame 2C from the seat lower side.

Figure 5:
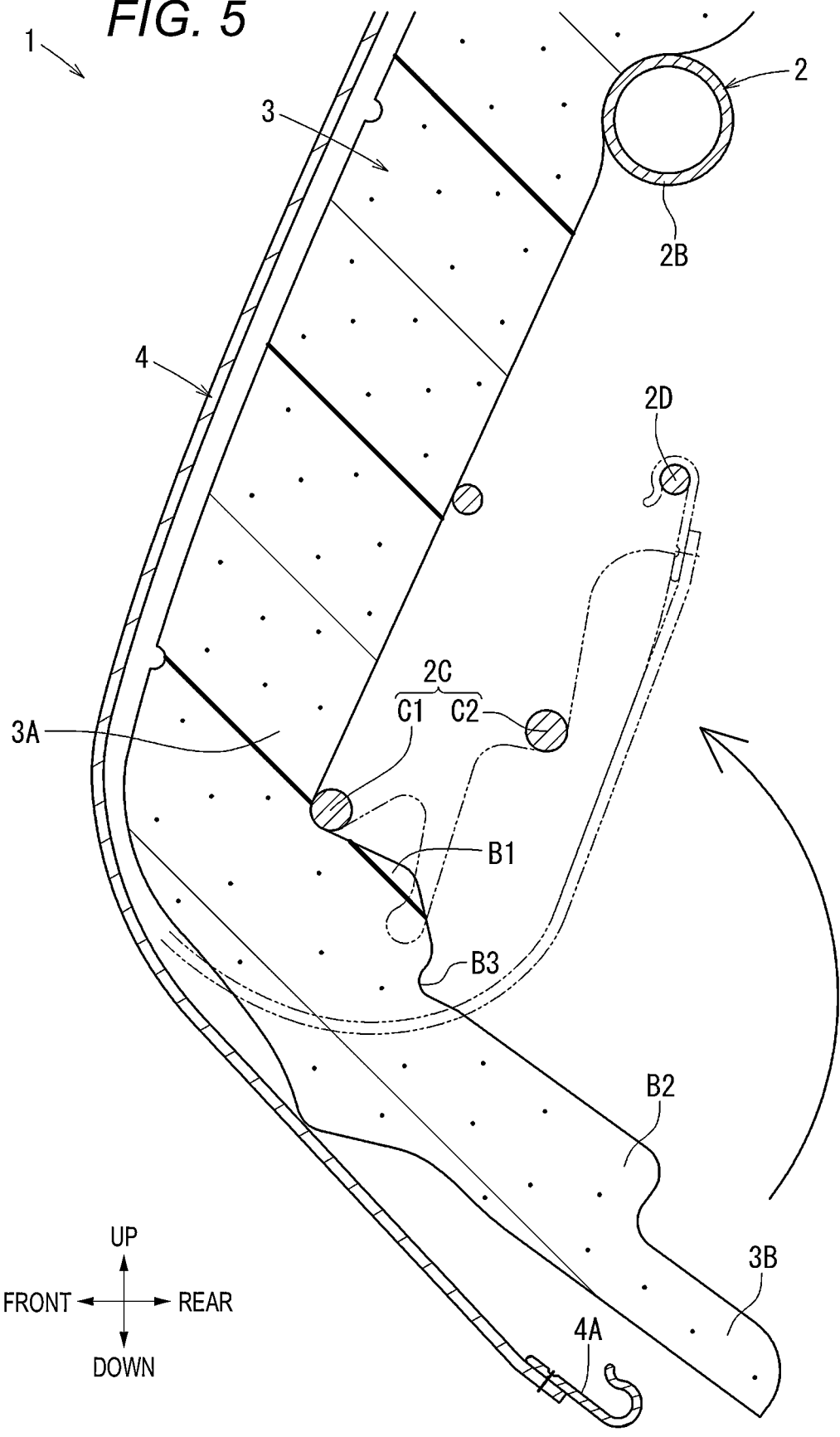
FIG. 5 is a cross-sectional view corresponding to FIG. 4, illustrating a state before a seat pad is assembled to a seat frame.

As illustrated in FIG. 5, the pad bending back portion 3B is originally formed in a shape that extends directly from the pad lower portion 3A toward a seat rear lower side. On an upper surface of the pad bending back portion 3B, which is a pad back surface in the drawing, a first convex portion B1 and a second convex portion B2, which protrude in a shape extending in the seat width direction, are formed in a manner of being arranged apart from each other in a front-rear direction. Here, the first convex portion B1 corresponds to a "first contact portion" of the present invention, and the second convex portion B2 corresponds to a "second contact portion" of the present invention.

A pad groove portion B3 recessed in a shape extending in the seat width direction is formed between the first convex portion B1 and the second convex portion B2 on the pad back surface of the pad bending back portion 3B. The pad bending back portion 3B is set in a manner of winding the wire frame 2C from the seat lower side as follows.

That is, the pad bending back portion 3B is set in a manner that an inner corner with the pad lower portion 3A is brought into contact with the first wire C1 from the seat front side, and then the pad bending back portion 3B is bent back toward the seat rear upper side with a contact point as a fulcrum. At this time, the pad bending back portion 3B is implemented in a manner that a portion of the pad bending back portion 3B on the seat rear side can be easily bent back upward by using a portion where a pad thickness is reduced due to the pad groove portion B3 formed on the pad back surface as a hinge.

As illustrated in FIG. 4, with the above bending back, the first convex portion B1 of the pad bending back portion 3B goes around the seat rear side of the first wire C1 and is pressed against the first wire C1 from the seat rear side. Accordingly, the seat pad 3 is in a state in which the first wire C1 is pressed and sandwiched in a seat front-rear direction between the pad lower portion 3A and the first convex portion B1. Specifically, the seat pad 3 is in a state in which the pad back surface of the pad bending back portion 3B comes into contact with the first wire C1 from the seat lower side, and the first wire C1 is pressed and sandwiched in the seat front-rear direction between the pad lower portion 3A and the first convex portion B1.

As a result, the seat pad 3 is assembled in a state in which the seat pad 3 is held in a manner of not being displaced in the seat front-rear direction and being positioned in the seat height direction with respect to the first wire C1. In the pad bending back portion 3B, together with the bending back, the second convex portion B2 is pressed against the second wire C2 from the seat lower side in a manner of coming into contact with the second wire C2, and the pad back surface at a tip portion of the second convex portion B2 is pressed against the second wire C2 from the seat rear side in a manner of coming into contact with the second wire C2.

That is, the pad bending back portion 3B brings an inner corner between the pad back surface and the second convex portion B2 into contact with the second wire C2 from the seat rear lower side. With the above assembling, the pad bending back portion 3B is set in a manner of winding the first wire C1 and the second wire C2 from the seat lower side and sandwich the first wire C1 and the second wire C2 together in the seat front-rear direction.

The pad bending back portion 3B is set in a state of being in contact with the first wire C1 and the second wire C2 from the seat lower side. Further, the pad bending back portion 3B is set in a state of sandwiching the first wire C1 in the seat front-rear direction.

As a result, the seat pad 3 is assembled in a state of being less likely to be displaced with respect to the first wire C1 that is disposed at a position close to a backrest surface side of the wire frame 2C. In the seat pad 3, when the seat back 1 is tilted forward as described above with reference to FIG. 1, even if luggage (not illustrated) is brought into contact with, from rear of the seat, the lower portion of the seat pad 3 which faces rear of the seat, the pad bending back portion 3B which is the pad structure of the lower portion is less likely to sink inward. This is because, as illustrated in FIG. 4, the pad bending back portion 3B is supported by the first wire C1 and the second wire C2 from the pad back side (a lower side in the drawing).

When the pad bending back portion 3B is assembled to the wire frame 2C as described above, the first convex portion B1 and the second convex portion B2 are drawn in a manner of filling a gap between the first wire C1 and the second wire C2. The first convex portion B1 and the second convex portion B2 each protrude above the seat beyond the external common tangent L of the first wire C1 and the second wire C2.

The second convex portion B2 is adapted in a manner that a surface thereof, which faces directly above the seat, is brought into contact with the second wire C2 from the seat lower side. Accordingly, when the pad bending back portion 3B receives a load pushed from the seat lower side, the second convex portion B2 is appropriately supported from the pad back side (a seat upper side) by the second wire C2.

As illustrated in FIG. 3, the seat cover 4 is placed over the seat pad 3 from front of the seat. The seat cover 4 is pulled toward rear of the seat in a manner that upper, lower, left, and right peripheral edge portions thereof wind the peripheral edge portions of the seat pad 3.

The seat cover 4 is fixed to the seat frame 2 in a manner that each cover end pulled toward rear of the seat is hooked on the seat frame 2. With this fixing, the seat cover 4 presses the seat pad 3 against the seat frame 2 and holds the seat pad 3 in a position fixed state.

As illustrated in FIG. 4, the lower cover end of the seat cover 4 is pulled toward the seat rear upper side in a manner of winding the pad bending back portion 3B from the seat lower side. The lower cover end of the seat cover 4 includes a hanging hook 4A sewn to a distal end thereof, which is hooked on and fixed to the hanging wire 2D connected to the wire frame 2C. With this fixing, the seat cover 4 holds the pad bending back portion 3B in a state in which the pad bending back portion 3B is appropriately pressed against the first wire C1 and the second wire C2.

The back board 5 is assembled to the seat frame 2 from the seat rear side by using a locking tool such as a clip or a hook (not illustrated). Thus, the back board 5 forms a hard surface on a back surface of the seat back 1. The back board 5 forms a hard surface on the upwardly facing back surface of the seat back 1 when the seat back 1 is tilted forward as described above with reference to FIG. 1, the hard surface being less likely to be deflected even when luggage is placed thereon.

In summary, the seat back 1 according to the present embodiment has the following configuration. In the following description, reference numerals assigned in parentheses correspond to the configurations described in the embodiment described above.

That is, a seat back (1) includes: a seat pad (3); and a seat frame (2) configured to support the seat pad (3) from a pad back side. The seat frame (2) includes a wire frame (2C) configured to support a pad lower portion (3A) of the seat pad (3) from the pad back side. The seat pad (3) includes a pad bending back portion (3B) that extends from the pad lower portion (3A) toward a seat rear upper side in a manner of winding the wire frame (2C) from a seat lower side.

The wire frame (2C) includes a first wire (C1) that extends in a seat width direction in a manner of supporting the pad lower portion (3A) from a seat rear side, and a second wire (C2) that extends in the seat width direction in a manner of supporting the pad bending back portion (3B) from a seat front side that is the pad back side at a position separated from the first wire (C1) to the seat rear side. The seat pad (3) further includes, on a pad back surface of the pad bending back portion (3B), a first contact portion (B1) configured to come into contact with the first wire (C1) from the seat rear side.

According to the above configuration, the seat pad (3) can be assembled to the wire frame (2C) in a manner that the pad lower portion (3A) and the pad bending back portion (3B) are supported from the pad back side by the first wire (C1) and the second wire (C2). In addition, the seat pad (3) can be assembled to the wire frame (2C) in a manner that the first wire (C1) is sandwiched in the seat front-rear direction between the pad lower portion (3A) and the first contact portion (B1). Therefore, the pad lower portion (3A) and the pad bending back portion (3B) can be appropriately supported even if a frame structure for supporting the pad lower portion (3A) and the pad bending back portion (3B) is implemented by a simple wire structure including the first wire (C1) and the second wire (C2).

The pad bending back portion (3B) is configured to be wound in a manner of coming into contact with the first wire (C1) from the seat lower side, and further includes a second contact portion (B2) configured to come into contact with the second wire (C2) from the seat lower side. According to the above configuration, the pad bending back portion (3B) can be made less likely to be recessed by a pressing force from below the seat.

The pad bending back portion (3B) includes a streak-like pad groove portion (B3) that is recessed in a manner of extending in the seat width direction from the pad back side between the first contact portion (B1) and the second contact portion (B2). According to the above configuration, when the seat pad (3) is assembled to the seat frame (2), a portion where a pad thickness is reduced due to the pad groove portion (B3) can be used as the hinge, and the pad bending back portion (3B) can be moved to be opened or closed from the pad lower portion (3A). Accordingly, even if the pad bending back portion (3B) is provided, the seat pad (3) can be easily assembled to the seat frame (2).

The first contact portion (B1) is a protruding portion that protrudes above the seat beyond an external common tangent (L) on the seat lower side in contact with the first wire (C1) and the second wire (C2). According to the above configuration, the first contact portion (B1) can be more appropriately brought into contact with the first wire (C1) from the seat rear side.

OTHER EMBODIMENTS

The embodiments according to the present invention have been described with reference to one embodiment, whereas the present invention can be implemented in various forms other than the above embodiment.

1. The seat back according to the present invention is applicable not only to a seat to be mounted on a vehicle such as an automobile or a railroad vehicle, but also to a seat to be mounted on other vehicles such as an aircraft or a ship. The seat back is also applicable to a seat not to be mounted on a vehicle.

2. The wire frame may be formed of a single wire member in which the first wire and the second wire are connected to each other, or may be formed of separate wire members. The second wire may be provided at a position at a height the same as the first wire or at a position lower than the first wire.

When the second wire is positioned higher than the first wire, the pad bending back portion of the seat pad may not necessarily be formed in a manner that the first contact portion protrudes from the pad back surface as a protruding portion. That is, when the above positional relation is satisfied, the pad back surface of the pad bending back portion is formed in a shape extending along the external common tangent on the seat lower side in contact with the first wire and the second wire, resulting in the pad back surface becoming an inclined surface that rises rearward and upward. Therefore, by using this inclined surface as the first contact portion, the first wire can be sandwiched between the first contact portion and the pad lower portion in the seat front-rear direction.

3. The second contact portion may come into contact with the second wire directly from the seat lower side, or may come into contact with the second wire at an oblique angle. The pad bending back portion may not necessarily come into contact with the first wire from the seat lower side. This is because the seat pad is assembled in a manner of being appropriately held in a position with respect to the first wire by sandwiching the first wire between the pad lower portion and the first contact portion.

4. The seat pad may be implemented in a manner that an initial shape of the pad bending back portion is formed in a manner of being bent back so as to wind the wire frame from the seat lower side. Even if the initial shape of the pad bending back portion of the seat pad is bent back as described above or is not bent back as described above, by forming the pad groove portion, the pad bending back portion can be easily moved to be opened or closed from the pad lower portion. The seat pad may have a configuration in which the pad bending back portion has no pad groove portion.

What is claimed is:

1. A seat back, comprising:
a seat pad; and
a seat frame configured to support the seat pad from a pad back side, wherein
the seat frame includes a wire frame configured to support a pad lower portion of the seat pad from the pad back side,
the seat pad includes a pad bending back portion that extends from the pad lower portion toward a seat rear upper side in a manner of covering the wire frame from a seat lower side,
the wire frame includes a first wire that extends in a seat width direction in a manner of supporting the pad lower portion from a seat rear side, and a second wire that extends in the seat width direction in a manner of supporting the pad bending back portion from a seat front side that is the pad back side at a position separated from the first wire to the seat rear side, and
the seat pad further includes, on a pad back surface of the pad bending back portion, a first contact portion configured to come into contact with the first wire from the seat rear side.

2. The seat back according to claim 1, wherein
the pad bending back portion is configured to be wound in a manner of coming into contact with the first wire from the seat lower side, and further includes a second contact portion configured to come into contact with the second wire from the seat lower side.

3. The seat back according to claim 2, wherein
the pad bending back portion includes a streak-like pad groove portion that is recessed from the pad back side between the first contact portion and the second contact portion in a manner of extending in the seat width direction.

4. The seat back according to claim 1, wherein
the first contact portion is a protruding portion that protrudes to a seat upper side beyond an external common tangent of the first wire and the second wire at the seat lower side.

5. The seat back according to claim 2, wherein
the first contact portion is a protruding portion that protrudes to a seat upper side beyond an external common tangent of the first wire and the second wire at the seat lower side.

6. The seat back according to claim 3, wherein
the first contact portion is a protruding portion that protrudes to a seat upper side beyond an external common tangent of the first wire and the second wire at the seat lower side.

* * * * *